(12) United States Patent
Squibbs et al.

(10) Patent No.: US 6,766,000 B2
(45) Date of Patent: Jul. 20, 2004

(54) RECORDAL SERVICE FOR VOICE COMMUNICATIONS

(75) Inventors: Robert Francis Squibbs, Bristol (GB); Richard Graham Lloyd, St. Egreve (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 161 days.

(21) Appl. No.: 10/005,903

(22) Filed: Dec. 4, 2001

(65) Prior Publication Data

US 2002/0094065 A1 Jul. 18, 2002

(30) Foreign Application Priority Data

Dec. 5, 2000 (GB) .............................................. 0029574

(51) Int. Cl.⁷ ................................................ H04M 1/64
(52) U.S. Cl. ......................... 379/88.23; 360/55; 369/17
(58) Field of Search ........................... 379/67.1, 75, 81, 379/88.04, 88.26, 88.22, 88.23; 346/24, 34, 44, 45, 47, 65; 360/5, 13, 55; 369/7, 17, 25.01, 26.01; 455/416; 364/401, 408

(56) References Cited

U.S. PATENT DOCUMENTS

| | | | |
|---|---|---|---|
| 5,544,231 A | | 8/1996 | Cho ............................ 379/67 |
| 5,943,402 A | * | 8/1999 | Hamel et al. ............ 379/88.26 |
| 6,041,104 A | | 3/2000 | Lipton et al. ............... 379/67.1 |
| 6,044,368 A | * | 3/2000 | Powers ........................... 707/2 |
| 6,385,306 B1 | * | 5/2002 | Baxter, Jr. ............... 379/88.13 |
| 6,483,899 B2 | * | 11/2002 | Agraharam et al. ..... 379/88.14 |
| 6,529,602 B1 | * | 3/2003 | Walker et al. .............. 380/283 |

FOREIGN PATENT DOCUMENTS

| | | |
|---|---|---|
| EP | 0561180 | 9/1993 |
| EP | 1199870 | 4/2002 |
| GB | 2 327 173 | 1/1999 |
| GB | 2 352 359 | 1/2001 |
| WO | 98/39901 | 9/1998 |
| WO | 99/31861 | 6/1999 |
| WO | 00/76188 | 12/2000 |
| WO | 01/61919 | 8/2001 |

* cited by examiner

*Primary Examiner*—Fan Tsang
*Assistant Examiner*—Ming Chow

(57) ABSTRACT

A service system is provided for recording spoken passages exchanged between parties, for example, via the public telephone system. The service system is called into action preferably by the agreement of the parties and is used to make a recording of the spoken exchanges between the parties. At the termination of recording, each party is preferably provided with the opportunity to review the recording and asked to confirm their acceptance of the recording. The service system then provides a reference copy of the recording. Where a digital copy of the recording is made, the parties are preferably required to indicate their acceptance by digitally signing and returning the recording to the service system.

29 Claims, 3 Drawing Sheets

RECORDAL SERVICE FOR VOICE COMMUNICATIONS

FIELD OF THE INVENTION

The present invention relates to the recordal, by a trusted party, of spoken passages exchanged between multiple parties; in particular, but not exclusively the present invention relates to a service for recording oral contracts made by telephone.

BACKGROUND OF THE INVENTION

U.S. Pat. No. 6,041,104 describes a method for ordering a telecommunication service in which an intelligent peripheral plays a "terms and conditions" message to an individual requesting the service, and recognizes and records a verbal response from a user in a database record in order to form a contract.

It is an object of the present invention to provide a straight-forward way of having a trusted party record an oral agreement made over the telephone and, more generally to have a trusted party record any form of spoken passage exchanged between multiple parties.

In one aspect disclosed herein, a method for memorializing a conversation between multiple parties comprises at the start of, or during the course of, voice communication between the parties over a communications infrastructure, routing voice streams from each party to a recordal service, which thereupon makes a recording of the voice streams, provides each party with at least the opportunity to review the recording, asks each party to independently indicate their individual acceptance of the recording, and provides a reference copy of the recording as a copy accepted by all parties only if all parties have indicated their individual acceptance to the recordal service.

In another aspect disclosed herein, a system for recording a conversation between multiple parties comprises a communications interface for receiving voice streams from each party, recording means for making a recording of the voice streams, and control means for commencing and terminating the recording, for asking each party to individually indicate acceptance of the recording made by providing each party with at least the opportunity to review the recording, and for making a reference copy of the recording available to the parties only when each party has individually indicated acceptance.

BRIEF DESCRIPTION OF THE DRAWINGS

A method and service system embodying the invention, for the recording of spoken passages by a trusted party, will now be described, by way of non-limiting example, with reference to the accompanying diagrammatic drawings, in which.

BEST MODE OF CARRYING OUT THE INVENTION

Figure 1:
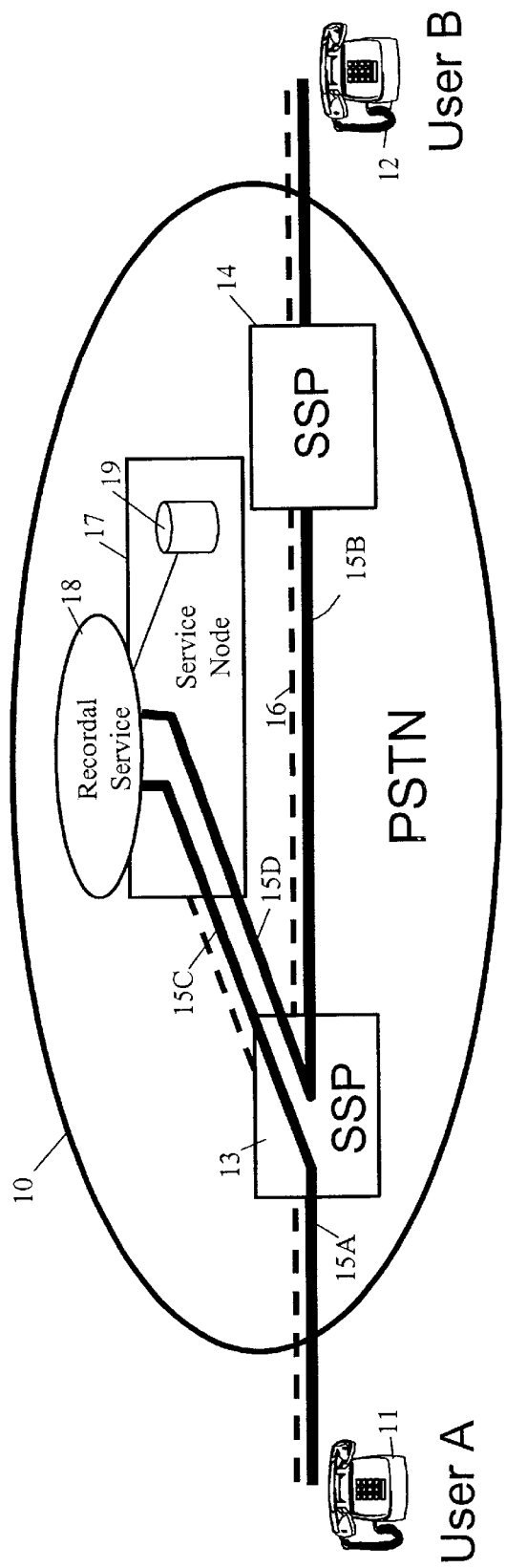
FIG. 1 is a diagram of a recordal service system embodying the invention provided in the context of a PSTN.

FIG. 1 depicts a voice recordal service 18 associated with a service node 17 of a Public Switched Telephone Network PSTN 10. The PSTN 10 comprises switches 13, 14 for setting up bearer circuits (shown as thick lines) through the PSTN between telephones in accordance with control signals passed over signalling channels 16 (shown as dashed lines). In the FIG. 1 PSTN, the switches 13, 14 constitute service switching points (SSP), that is, they are capable of detecting when a dialled number corresponds to a request for a particular service (such as an 800 number service). When an SSP detects such a service request, it hands off control to another network element such as a service control point SCP (not illustrated) or a service node such as node 17. A service node differs from an SCP in that, as well as including an environment for running service logic programs for effecting call control (as does an SCP), it further includes functionality for interfacing with the voice bearer circuits of the PSTN in order to carry out special functions such as DTMF tone collection, delivery of voice messages, voice recognition, text to speech conversion, etc. as is well understood by persons skilled in the art.

In the present example, two telephone users A and B communicating via PSTN 10 using their respective telephones 11, 12, determine that they wish to record an agreement regarding the subject of their telephone conversation. To do this, user A signals to SSP 13 (for example, by a "flash hook" signal following by dialling a special recordal service number)—see step 21 of the FIG. 2 flow chart. SSP 13, on recognising the dialled number as that associated with the recordal service, responds by routing both the user A call branch 15A and the user B call branch 15B over respective circuits 15C and 15D to service node 17 along with signalling information causing the call branches to be associated with a newly created instance of the recordal service 9 (see step 22).

The recordal service instance now causes each party to be played an initial message explaining what is happening and the terms of use of the service (step 23); each party is asked to confirm their understanding of these matters. Either user may exit the service at this time.

Assuming both parties indicate they wish to continue, then the call branches are connected at the service node and the parties exchange spoken passages setting out the matters to be recorded; the recordal service makes a recording of these exchanges (step 24). Should either party terminate the call by replacing their phone during the recording process (or, indeed, at any time before the service process has completed all its steps), then the recordal process is abandoned by the service and the recording is erased.

When the parties have finished the exchange they wish recorded, one party indicates this by pressing a predetermined key sequence which is recognised by the service at the service node (step 25). The parties are then individually asked to confirm that recording should be terminated; if one party indicates otherwise, then recording is resumed.

When the recording has been terminated by mutual consent, the parties are then given an opportunity to review the recording by having it played back to them (step 26). This step can be made obligatory (or, conversely, but not preferably, omitted entirely together with the following step of acceptance of the replayed recording). The playback of the recording by the service system is effected with the superposition of a continuity sound signal (such as a continuously rising, or cyclically varying, tone). This signal provides a ready indication to each user as to whether any parts of the played back recording has failed to reach them since breaks in the continuity sound signal are easily noted, even whilst the user listens to the spoken content of the playback.

At the end of playback of the recording, each user is independently asked to indicate their acceptance of the recording (step 27). Only if both parties confirm acceptance (for example, by appropriate key presses) does the service system proceed to the final step (step 28) of establishing a definitive recording that both parties can trust. This definitive recording is stored in secure storage 19 at, or accessible from, the service system. Finally, each party is given an access code which they can use subsequently to access and playback the recording by dialling a playback number of the service system and entering the code using key presses.

The recordal service can now either terminate the call with both parties or instruct the SSP 13 to take back the call and reconnect the call branches at the switch.

Since in the above process the only identification of the parties that is present in the recording resides in what is said and the voice characteristics, it is preferable that the service associates further identification information with the recording such as obtained through calling line identification. Greater certainty can be achieved by requiring users of the service to have pre-registered at which time each user is given a unique secret code which the user must key in during step 23 of the recordal service process.

Figure 3:
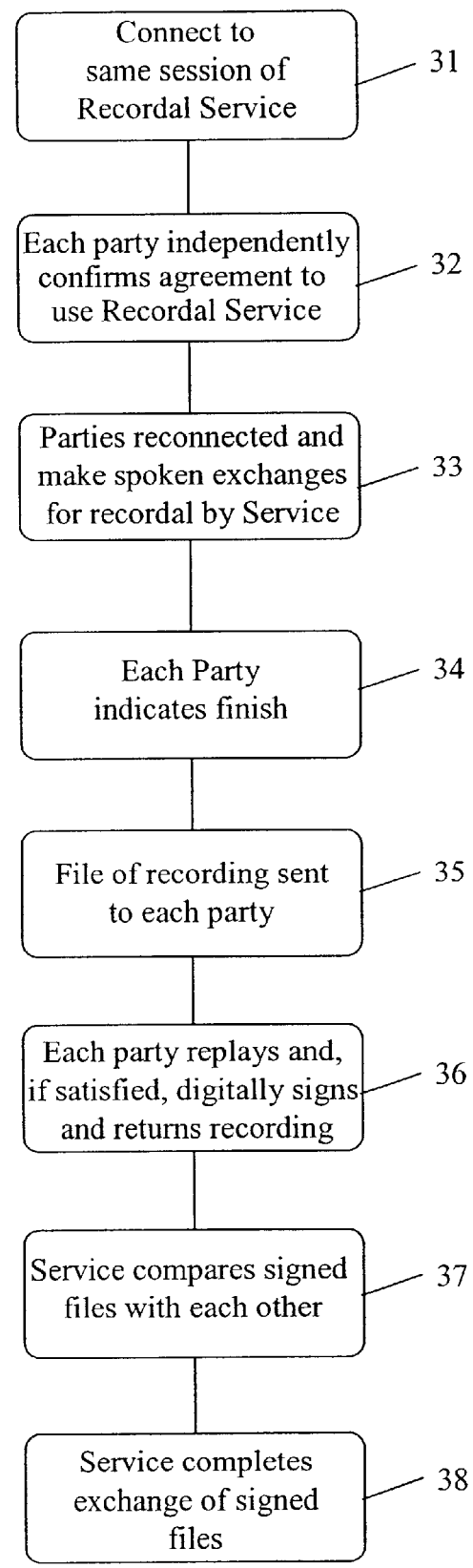
FIG. 3 is a flow chart showing the main process steps carried out by a second service system embodying the invention, in recording spoken exchanges between two parties communicating via a packet-switched network.

A more secure recording process can be achieved where the parties are in voice communication by a fully digital data network (for example, a Voice Over IP exchange—VoIP— effected across the public internet between internet-connected PCs), since this permits digital signature techniques to be employed. An example recording process for a such an environment is depicted by the flow chart of FIG. 3, it being assumed that the parties have agreed to have their exchange recorded and have both contacted a recordal service and joined a common recordal session at the service (this can be achieved in a number of ways, as will be apparent to persons skilled in the art, including by incorporating dedicated software into the package used for VoIP telephony by each party).

After both parties have connected to the recordal session (step 31), the recordal service terms are presented to each party (step 32) with recording only proceeding if both parties indicate their acceptance (step 33). Recording now proceeds and in due course the parties both indicate that the recording should be stopped, thereby terminating the making of the recording (step 34). The recording made by the service system is digital in nature and typically comprises a compressed audio file; where the service system has a speech recognition facility, then the recording could alternatively take the form of a text transcript.

Figure 2:
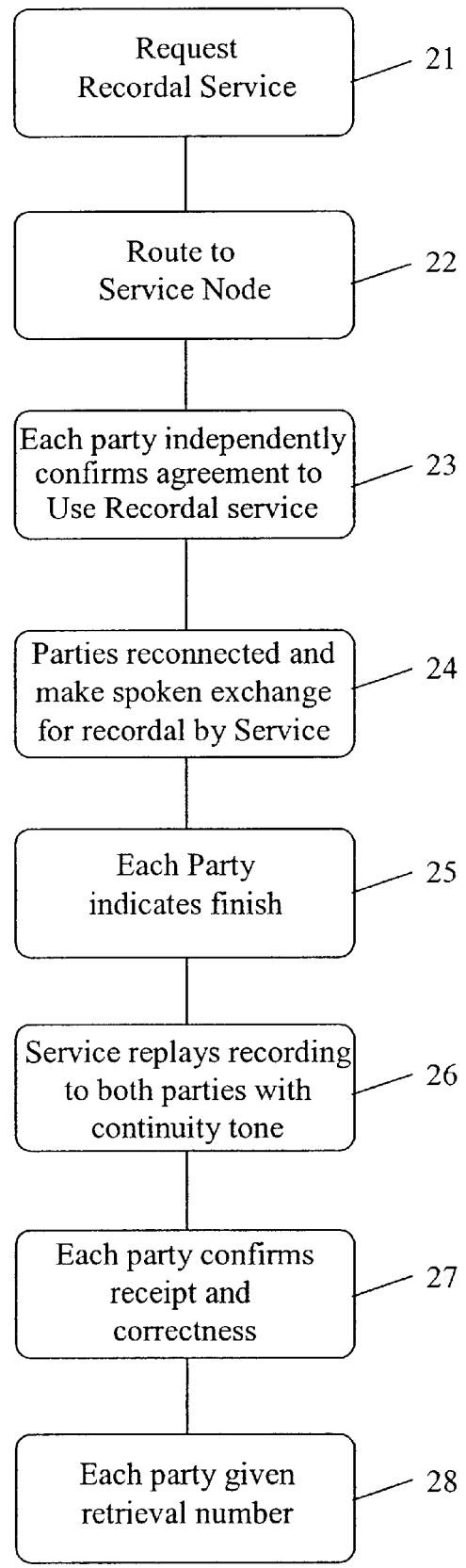
FIG. 2 is a flow chart showing the main process steps carried out by the FIG. 1 service system in recording spoken exchanges between two parties communicating via the PSTN.

A copy of the digital recording is now sent to each party for review (as already indicated for the embodiment of FIGS. 1 and 2, this step 35 can be omitted, made optional or obligatory). Each party reviews the recording and if satisfied, digitally signs it (step 36), without making any changes, using a party-specific public key of a public/private key pair previously obtained from a certification authority in well known manner. The parties then return the signed recordings to the service system which then uses the public key of each party to confirm that the returned recordings correspond to what each party signed and are identical to the recording sent to each party (step 37).

Having each party sign a copy of the recording using their private key provides for non-repudiation by the signing party (that is, the signature makes it impossible for the party to deny that they agreed to the recording, assuming that the digital signature technology used has not been compromised).

Assuming that the returned signed recordings match that sent out, the service system then sends a copy of the recording, digitally signed by the service with its own private key, to both parties; this copy forms the 'reference' copy of the recording intended to be referred to by the parties as a true copy of their recorded exchanges. The service will generally also store the reference copy of the recording (and preferably of the signed recordings returned by each party which may also be provided to the other party or parties as indicated in step 38). In fact, the service need not provide a copy of the recording signed by itself to each party if it has securely stored a copy of the recording as the reference copy or if it has passed each party the copy signed by the other party or parties (in which case, these signed copies become the reference copies). In cases where the service stores a reference copy of the recording, it will generally provide access codes to the parties giving them read access rights.

Many other variants are, of course, possible to the arrangements described above. For example, the step of confirming usage conditions of the service can be omitted, particularly where one or both parties have previously registered with the service.

Furthermore, even where the parties are talking to each other over an analogue line, the recordal service can still make a digital recording of the exchanges between the parties, and then sent copies of the recording for review and acceptance by the parties either over the analogue lines (with the use of modems) or over a separate digital link. The review and acceptance of the recording need not necessarily be done during the course of the call giving rise to the recording and could be done later.

What is claimed is:

1. A method of memorializing a conversation between multiple parties, comprising:
    at the start of, or during the course of, voice communication between the parties over a communications infrastructure, routing voice streams from each party to a recordal service, which thereupon:
    (a) makes a recording of the voice streams;
    (b) provides each party with at least the opportunity to review the recording;
    (c) asks each party to independently indicate their individual acceptance of the recording; and
    (d) provides a reference copy of the recording as a copy accepted by all parties only if all parties have indicated their individual acceptance to the recordal service.

2. A method according to claim 1, wherein the recording is digital in form and said indicating individual acceptance of the recording by a said party further comprises:
    receiving from that party an unaltered copy of the digital recording, the received recording digitally signed by the party using a party-specific private key; and
    confirming that the copy of the digital recording received from said party has not been altered by checking that it corresponds to the recording sent for signing.

3. A method according to claim 2, wherein providing the reference copy comprises:
    the service digitally signing a copy of the recording with its private key to form the reference copy of the recording; and then
    providing the reference copy to each party and/or storing the reference copy at the service.

4. A method according to claim 2, wherein providing the reference copy comprises:
    the service passing on the signed copies it has received to the parties and/or storing the signed recordings, the signed recordings each constituting a said reference copy.

5. A method according to claim 2, further comprising:
    processing the voice streams for speech recognition to form a transcript text file of the conversation; and wherein asking the parties to indicate acceptance comprises asking the parties to indicate individual acceptance of the transcript text file.

6. A method according to claim 1, wherein the voice circuits of the parties are routed to a service node of a public telephone system for provision of the recordal service, the method further comprising:

providing the recording for review by each party from the recordal service through voice playback of the recording; and storing a copy of the recording as the reference copy.

7. A method according to claim 6, wherein the playback of the recording comprises:

a continuity sound signal played simultaneously with the recording for facilitating identification by a party of incompleteness of receipt of the playback.

8. A method according to claim 6, further comprising:

confirming the identity of each party with calling line identification and/or a party-specific unique identifier previously issued by the service.

9. A method according to claim 1, wherein providing each party with the opportunity to review and asking each party to individually indicate acceptance are performed independently of said voice communication between the parties.

10. A method according to claim 1, wherein the voice communication between the parties is effected by digitized voice data packets transmitted and received by the parties.

11. A method according to claim 1, further comprising prior to making the recording:

independently asking each party to indicate their acceptance of the use of the recordal service.

12. A method according to claim 1, further comprising:

prior to terminating the recording, asking each party to independently indicate their acceptance of termination of the recording.

13. A method according to claim 1, further comprising:

asking each party to indicate their acceptance of each of commencement of recording and termination of recording.

14. A method according to claim 1, wherein the voice streams pass between the parties via the recordal service.

15. A method according to claim 1, wherein the reference copy of the recording is stored by the service and the method further comprises:

providing each party with a code or codes for enabling subsequent read access by the party to the stored reference copy of the recording.

16. A system for recording a conversation between multiple parties, comprising:

a communications interface for receiving voice streams from each party;

recording means for making a recording of the voice streams; and control means for commencing and terminating the recording, for asking each party to individually indicate acceptance of the recording made by providing each party with at least the opportunity to review the recording, and for making a reference copy of the recording available to the parties only when each party has individually indicated acceptance.

17. A system according to claim 16, wherein the recording means comprises means to make said recording in digital form, and wherein the control means comprise:

means for sending a copy of the recording to each party;

means for receiving back from each party wishing to indicate their acceptance of the recording, a copy of the recording digitally signed by the party with a party-specific private key; and means for checking that a digitally-signed copy of the recording returned from a said party corresponds to the recording sent for signing to that party.

18. A system according to claim 17, wherein the control means is arranged to generate the reference copy by digitally signing a copy of the recording with a private key of a public-key/private-key cryptographic pair.

19. A system according to claim 17, wherein the control means is arranged to use the digitally-signed copies of the recording returned from the parties as said reference copy.

20. A system according to claim 17, wherein the recording means includes a speech recognition system for converting the voice streams into a transcript text file, the control means being arranged to use this file as the copy of the recording sent to the parties for signing.

21. A system according to claim 16 configured for use at a service node of a public telephone network, the control means being arranged to ask for acceptance of the recording by playing back the recording over a voice circuit of the telephone network.

22. A system according to claim 21, wherein the control means further comprise:

means for playing an on-going continuity sound signal simultaneously with the recording to facilitate the identification by a party of the incompleteness of receipt of the playback.

23. A system according to claim 16, wherein the control means is arranged to ask each party independently of said voice communication between the parties to indicate acceptance of the recording.

24. A system according to claim 16, wherein the voice communication between the parties is effected by digitized voice data packets transmitted and received by the parties, and wherein the communications interface is arranged to receive the voice streams in the form of digitized voice data packets.

25. A system according to claim 16, wherein the control means further comprises:

means to independently ask each party to indicate their acceptance of the use of the system prior to recording the voice streams.

26. A system according to claim 16, wherein the control means further comprises:

means to independently ask each party to indicate their acceptance of termination of the recording prior to terminating the recording.

27. A system according to claim 16, wherein the control means further comprises:

means to ask each party to indicate their acceptance of each of commencement of recording and termination of recording.

28. A system according to claim 16, wherein the voice streams pass between the parties via the recordal service and the communications interface is arranged to forward the voice stream received from each party to the other parties.

29. A system according to claim 16, further comprising:

storage means for storing the reference copy of the recording;

means for providing each party with a code or codes for enabling subsequent read access by the party to the stored copy; and means for providing code-restricted read access to the reference copy of the recording.

* * * * *